(12) United States Patent
Kaneda et al.

(10) Patent No.: US 11,225,149 B2
(45) Date of Patent: Jan. 18, 2022

(54) ELECTRIC WORK MACHINE

(71) Applicant: Yanmar Power Technology Co., Ltd., Osaka (JP)

(72) Inventors: Kensuke Kaneda, Chikugo (JP); Jun Terashima, Chikugo (JP)

(73) Assignee: YANMAR POWER TECHNOLOGY CO., LTD., Osaka (JP)

( * ) Notice: Subject to any disclaimer, the term of this patent is extended or adjusted under 35 U.S.C. 154(b) by 0 days.

(21) Appl. No.: 17/050,324

(22) PCT Filed: Apr. 15, 2019

(86) PCT No.: PCT/JP2019/016149
§ 371 (c)(1),
(2) Date: Oct. 23, 2020

(87) PCT Pub. No.: WO2019/208304
PCT Pub. Date: Oct. 31, 2019

(65) Prior Publication Data
US 2021/0129682 A1 May 6, 2021

(30) Foreign Application Priority Data
Apr. 24, 2018 (JP) .............................. JP2018-083094

(51) Int. Cl.
*B60L 15/20* (2006.01)
*H02P 27/06* (2006.01)
(Continued)

(52) U.S. Cl.
CPC .............. *B60L 15/20* (2013.01); *B60L 50/66* (2019.02); *B60L 53/20* (2019.02); *H02J 7/0068* (2013.01);
(Continued)

(58) Field of Classification Search
None
See application file for complete search history.

(56) References Cited

U.S. PATENT DOCUMENTS

| 2010/0096921 A1* | 4/2010 | Ishida ..................... B60L 58/20 307/9.1 |
| 2011/0187184 A1 | 8/2011 | Ichikawa |
| 2013/0197766 A1* | 8/2013 | Kurikuma ............. E02F 9/2091 701/50 |

FOREIGN PATENT DOCUMENTS

| JP | 2007-228715 A | 9/2007 |
| JP | 2008-308881 A | 12/2008 |

(Continued)

OTHER PUBLICATIONS

International Search Report dated May 14, 2019 issued in corresponding PCT Application PCT/JP2019/016149 cites the patent documents above.

*Primary Examiner* — Jared Fureman
*Assistant Examiner* — Aqeel H Bukhari
(74) *Attorney, Agent, or Firm* — Norton Rose Fulbright US LLP

(57) ABSTRACT

An excavator comprising: a power supply that converts AC power supply voltage from a commercial power supply into DC power supply voltage; a battery that charges or discharges power from the power supply; an inverter that converts DC power supply voltage to AC power supply voltage; an electric motor that has power supplied thereto, and is controlled, by the inverter; a first electrical circuit that supplies power to the inverter from the power supply; a second electrical circuit that joins from the battery to the first electrical circuit; an inverter relay arranged between the inverter and a junction point between the first electrical circuit and the second electrical circuit; a battery relay arranged between the junction point and the battery; and a (Continued)

power supply relay arranged between the junction point and the power supply.

8 Claims, 7 Drawing Sheets

(51) Int. Cl.
*H02J 7/00* (2006.01)
*B60L 53/20* (2019.01)
*B60L 50/60* (2019.01)

(52) U.S. Cl.
CPC ............ *H02P 27/06* (2013.01); *B60L 2210/30* (2013.01); *B60L 2240/527* (2013.01); *B60L 2240/529* (2013.01)

(56) References Cited

FOREIGN PATENT DOCUMENTS

| | | |
|---|---|---|
| JP | 2009-097270 A | 5/2009 |
| JP | 2009-225587 A | 10/2009 |
| JP | 2010-121327 A | 6/2010 |

\* cited by examiner

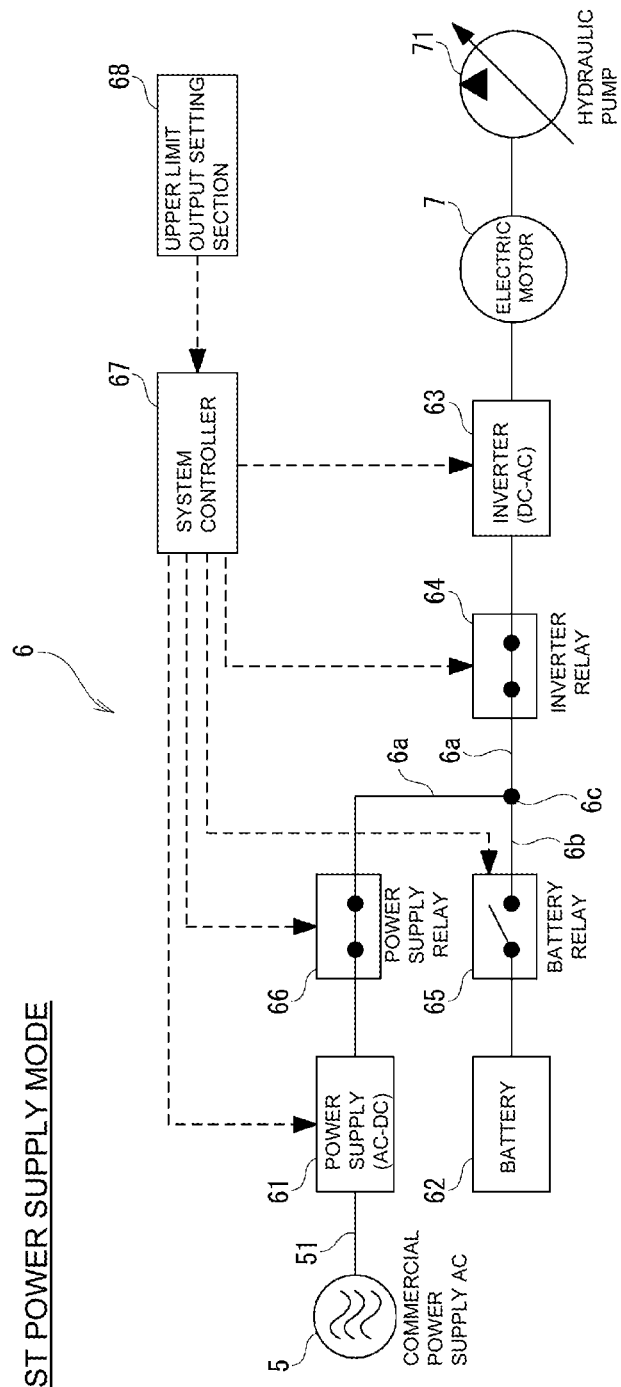

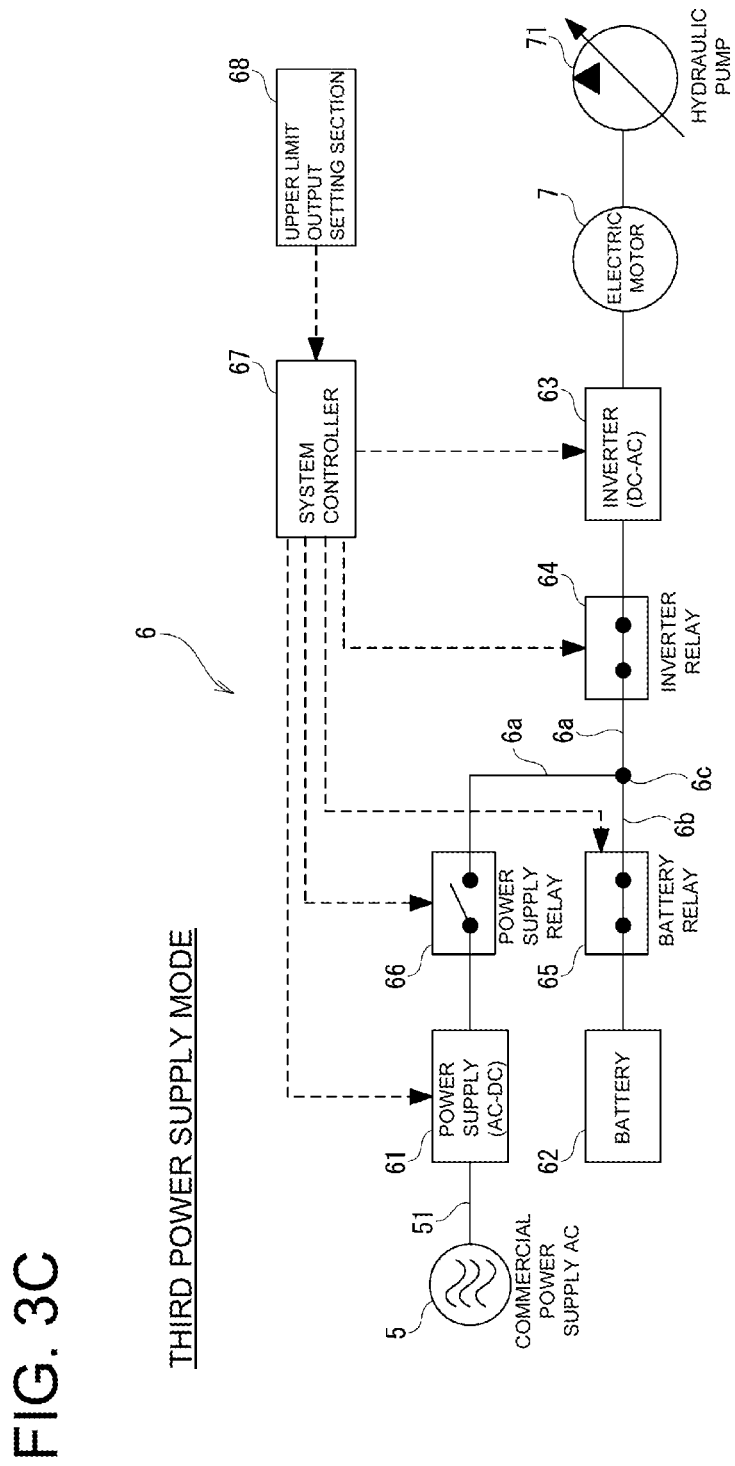

FOURTH POWER SUPPLY MODE

ELECTRIC WORK MACHINE

TECHNICAL FIELD

The present invention relates to an electric work machine.

BACKGROUND ART

In Patent Literature 1 below, a construction machine on which a power supply system for driving an electric motor with a commercial power supply and a battery is mounted is disclosed. This power supply system includes a power supply switching device that switches an electrical circuit between an electrical circuit that supplies a direct-current power supply from the battery to an inverter converting direct-current power into any alternating-current power and supplying the alternating-current power to the electric motor and an electrical circuit that converts the alternating-current power supplied from the commercial power supply into the direct-current power via an AC/DC converting section and supplies the direct-current power to the inverter.

In Patent Literature 2 below, an operation condition of an electric excavator as an electric excavator driven by a commercial power supply and a battery is disclosed. The electric excavator has: a mode in which an electric motor is driven while a battery is being charged by the commercial power supply as an external power supply; a mode in which only the battery is charged by the external power supply; and a mode in which the electric motor is driven by the battery only. The operation condition thereof includes turning on/off of a switch arranged in an electrical circuit from the battery to the electric motor and a switch arranged in an electric circuit from the battery to the external power supply, the switches being used to shift the mode.

CITATION LIST

Patent Literature

Patent Literature 1: Japanese Unexamined Patent Application Publication No. 2007-228715
Patent Literature 2: Japanese Unexamined Patent Application Publication No. 2008-308881

DISCLOSURE OF INVENTION

Problems to be Solved by the Invention

In Patent Literature 1, the commercial power supply and the battery are selected. Thus, in the case where the electric motor is driven only with electric power from the commercial power supply, the electric power for driving the electric motor depends on the commercial power supply, which leads to such a problem that sufficient drive power cannot be obtained in a case of work requiring high drive power. In Patent Literature 2, a mode in which the electric power is driven by the commercial power supply only does not exist. In addition, in Patent Literature 2, in the mode in which the electric motor is driven while the battery is being charged by the commercial power supply, the electric motor can be usually driven by either the battery or the external power supply due to design of the electrical circuits. However, in the case where abnormality occurs to the battery, there is a problem that the work cannot be continued. Furthermore, in the case where a state of charge (SOC) reaches a lower limit value in a battery mode in which only the battery is used as a drive source, there is a problem that the work can no longer be performed.

The present invention has been made in view of the above problems and therefore has a purpose of providing an electric work machine having a drive mode in which an electric motor is driven by one or both of an external power supply and a battery and a charging mode in which only the battery is charged by the external power supply.

Means for Solving the Problems

An electric work machine according to the present invention includes: a power supply that converts an alternating-current power supply voltage of an external power supply into a direct-current power supply voltage; a battery that charges or discharges electric power from the power supply; an inverter that converts the direct-current power supply voltage into the alternating-current power supply voltage; an electric motor that is supplied with the electric power from the inverter and is controlled; a first electrical circuit that supplies the electric power from the power supply to the inverter; a second electrical circuit that joins the first electrical circuit from the battery; an inverter relay that is arranged between the inverter and a junction point between the first electrical circuit and the second electrical circuit; a battery relay that is arranged between the junction point and the battery; and a power supply relay that is arranged between the junction point and the power supply.

The present invention includes: a first power supply mode configured by contacting contacts of the inverter relay and the power supply relay and separating contacts of the battery relay; and a second power supply mode configured by contacting the contacts of the inverter relay, the power supply relay, and the battery relay. In the first power supply mode, the power supply may be controlled on the basis of a rated voltage of the inverter. In the second power supply mode, the power supply may be controlled to have a rated current that is determined by an upper limit value of the external power supply.

In the present invention, in the first power supply mode, an upper limit value of output of the inverter may be set to a threshold value corresponding to a current that can be supplied by the external power supply.

According to the present invention, by switching the inverter relay, the battery relay, and the power supply relay, it is possible to implement: a drive mode in which the electric motor is driven by one or both of the external power supply and the battery; and a charging mode in which only the battery is charged by the external power supply. In addition, since the electric motor can be supplied with the electric power only from the external power supply, a frequency of use of the battery can be reduced, and life of the battery can be extended. Furthermore, even in the case where the battery is brought into an abnormal state, work can be continued only with the external power supply.

BRIEF DESCRIPTION OF DRAWINGS

FIG. 3A is a block diagram of the power supply system implementing a first power supply mode.

FIG. 3C is a block diagram of the power supply system implementing a third power supply mode.

DESCRIPTION OF EMBODIMENTS

A description will hereinafter be made on embodiments of the present invention with reference to the drawings.

[Configuration of Electric Work Machine]

Figure 1:
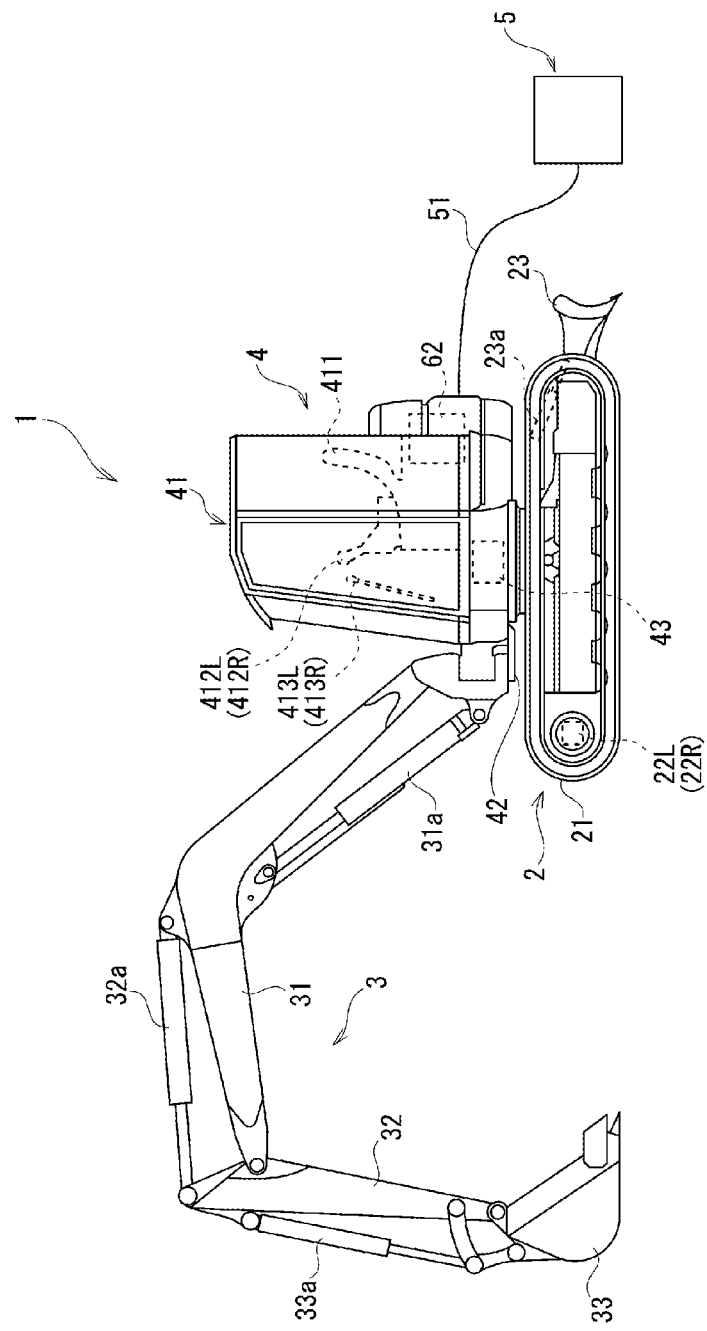
FIG. 1 is a side view illustrating an electric work machine according to this embodiment.

First, a description will be made on a schematic structure of an excavator 1 as an example of the electric work machine with reference to FIG. 1. However, the example of the electric work machine is not limited to the excavator 1, and may be another vehicle such as a wheel loader. The excavator 1 includes a lower travel body 2, a work unit 3, and an upper turning body 4.

The lower travel body 2 includes a left and right pair of crawlers 21, 21 and a left and right pair of travel motors 22L, 22R. The left and right travel motors 22L, 22R as hydraulic motors drive the left and right crawlers 21, 21, respectively. In this way, the excavator 1 can travel forward and backward. In addition, the lower travel body 2 is provided with a blade 23 and a blade cylinder 23a that is a hydraulic cylinder for rotating the blade 23 in a vertical direction.

The work unit 3 includes a boom 31, an arm 32, and a bucket 33 and independently drives these components to enable excavation work of gravel or the like. The boom 31, the arm 32, and the bucket 33 each correspond to a work section, and the excavator 1 has a plurality of the work sections.

The boom 31 has a base end portion that is supported by a front portion of the upper turning body 4, and is rotated by a boom cylinder 31a movable in a freely extendable/contractable manner. The arm 32 has a base end portion that is supported by a tip portion of the boom 31, and is rotated by an arm cylinder 32a movable in a freely extendable/contractable manner. The bucket 33 has a base end portion that is supported by a tip portion of the arm 32, and is rotated by a bucket cylinder 33a movable in a freely extendable/contractable manner. Each of the boom cylinder 31a, the arm cylinder 32a, and the bucket cylinder 33a is constructed of a hydraulic cylinder.

The upper turning body 4 is configured to be turnable with respect to the lower travel body 2 via a turning bearing (not illustrated). In the upper turning body 4, an operation section 41, a turn table 42, a turning motor 43, a battery 62, and the like are arranged. With drive power of the turning motor 43 as a hydraulic motor, the upper turning body 4 turns via the turning bearing (not illustrated). In addition, plural hydraulic pumps (not illustrated in FIG. 1) that are driven by an electric motor are disposed in the upper turning body 4. These hydraulic pumps supply hydraulic oil to the hydraulic motors (the travel motors 22L, 22R and the turning motor 43) and the hydraulic cylinders (the blade cylinder 23a, the boom cylinder 31a, the arm cylinder 32a, and the bucket cylinder 33a). The hydraulic motors and the hydraulic cylinders will collectively be referred to as hydraulic actuators.

An operator seat 411 is arranged in the operation section 41. A left and right pair of work operation levers 412L, 412R is arranged on left and right sides of the operator seat 411, and a pair of travel levers 413L, 413R is arranged in front of the operator seat 411. When seated on the operator seat 411 and operating the work operation levers 412L, 412R, the travel levers 413L, 413R, or the like, an operator can control each of the hydraulic actuators, which allows travel, turning, work, or the like.

The upper turning body 4 is provided with a power supply port, which is not illustrated. When a power supply cable 51 for a commercial power supply 5 (corresponding to the external power supply) is connected to this power supply port, the commercial power supply 5 can be connected to a power supply system 6, which will be described below.

The hydraulic pump that supplies the hydraulic oil to the hydraulic actuator is configured to be actuated by the electric motor that is driven by electric power, and the commercial power supply 5 and the battery 62 supply the electric power to the electric motor.

[Configuration of Power Supply System]

Figure 2:
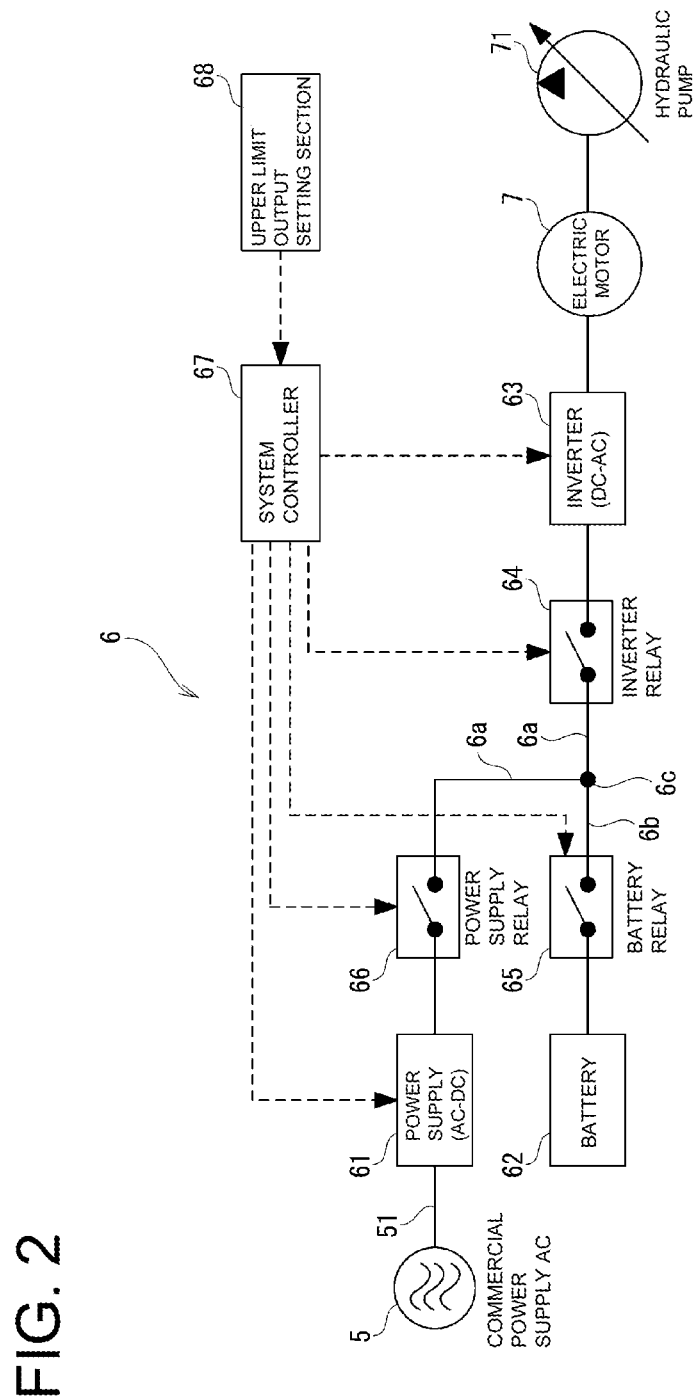
FIG. 2 is a block diagram of a power supply system mounted on the electric work machine.

A description will be made on the power supply system 6 that is mounted on the excavator 1 and supplies the electric power to the electric motor 7 with reference to FIG. 2. The power supply system 6 includes: a power supply 61 that converts an alternating-current power supply voltage of the commercial power supply 5 into a direct-current power supply voltage; a battery 62 that charges or discharges the electric power from the power supply 61; an inverter 63 that converts the direct-current power supply voltage into the alternating-current power supply voltage; a first electrical circuit 6a that supplies the electric power from the power supply 61 to the inverter 63; a second electrical circuit 6b that joins the first electrical circuit 6a from the battery 62; an inverter relay 64 arranged between the inverter 63 and a junction point 6c between the first electrical circuit 6a and the second electrical circuit 6b; a battery relay 65 arranged between the junction point 6c and the battery 62; and a power supply relay 66 arranged between the junction point 6c and the power supply 61.

The power supply 61 converts the alternating-current voltage that is supplied from the commercial power supply 5 via the power supply cable 51 into the direct-current voltage. This direct-current voltage is supplied to the battery 62 via the power supply relay 66 and the battery relay 65, and the battery 62 is thereby charged. The direct-current voltage of the power supply 61 is also supplied to the inverter 63 via the power supply relay 66 and the inverter relay 64.

The battery 62 supplies the direct-current voltage to the inverter 63 via the battery relay 65 and the inverter relay 64. An example of the battery 62 is a lithium-ion battery.

Figure 4:
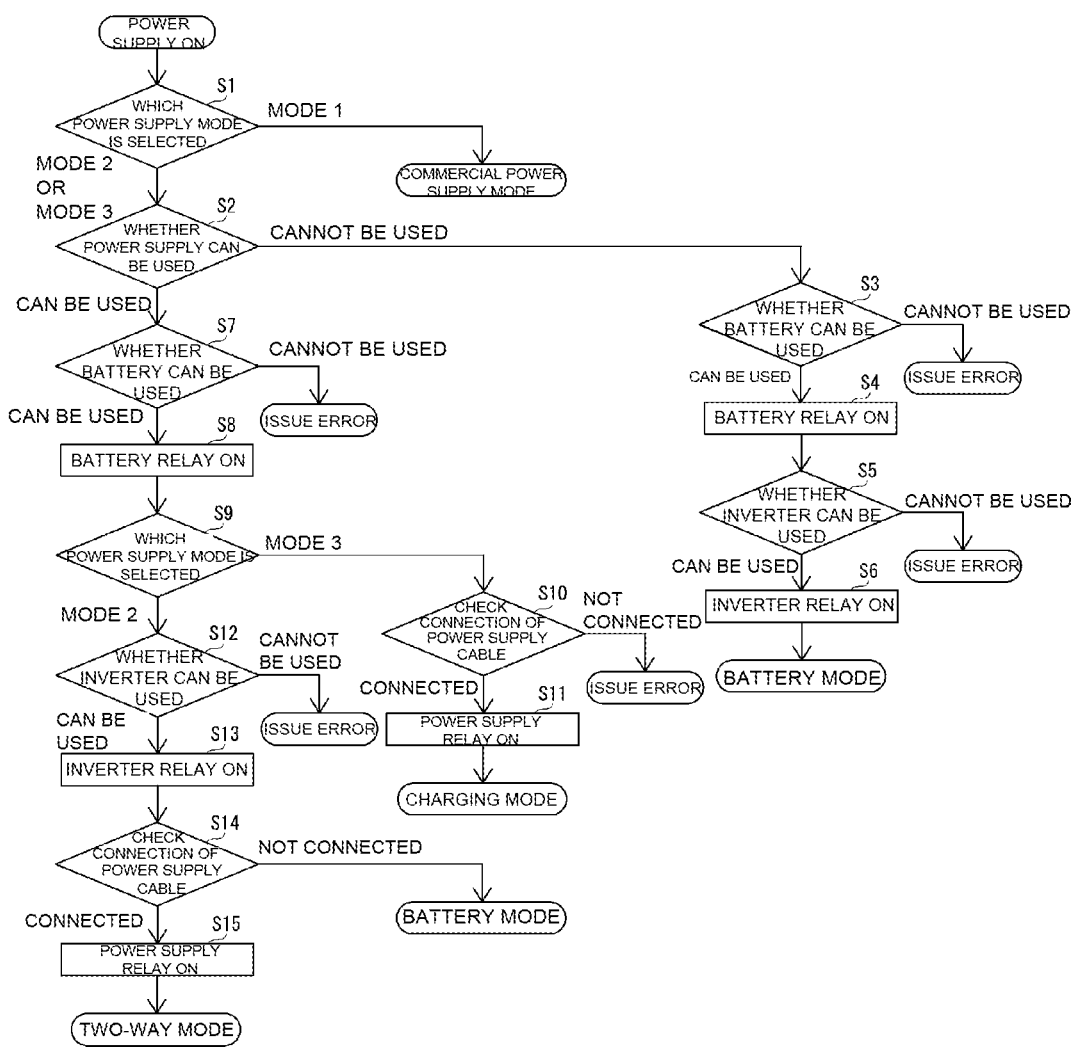
FIG. 4 is a flowchart illustrating a procedure of switching control of the power supply mode.

The inverter 63 converts the direct-current voltage, which is supplied from the power supply 61 and/or the battery 62, into the alternating-current voltage. This alternating-current voltage is supplied to an electric motor 7. The electric motor 7 actuates the hydraulic pump 113. Although only the hydraulic pump 113 is illustrated in FIG. 4, the plural hydraulic pumps may be provided.

The power supply system 6 also includes a system controller 67 for controlling the power supply system 6. The system controller 67 executes control of the electric power to be supplied to the electric motor 7, control of charging of the battery 62, and the like. More specifically, the system controller 67 controls the power supply 61, the inverter 63, the inverter relay 64, the battery relay 65, the power supply relay 66, and the like so as to be able to drive the electric motor 7 and charge the battery 62.

Figure 3B:
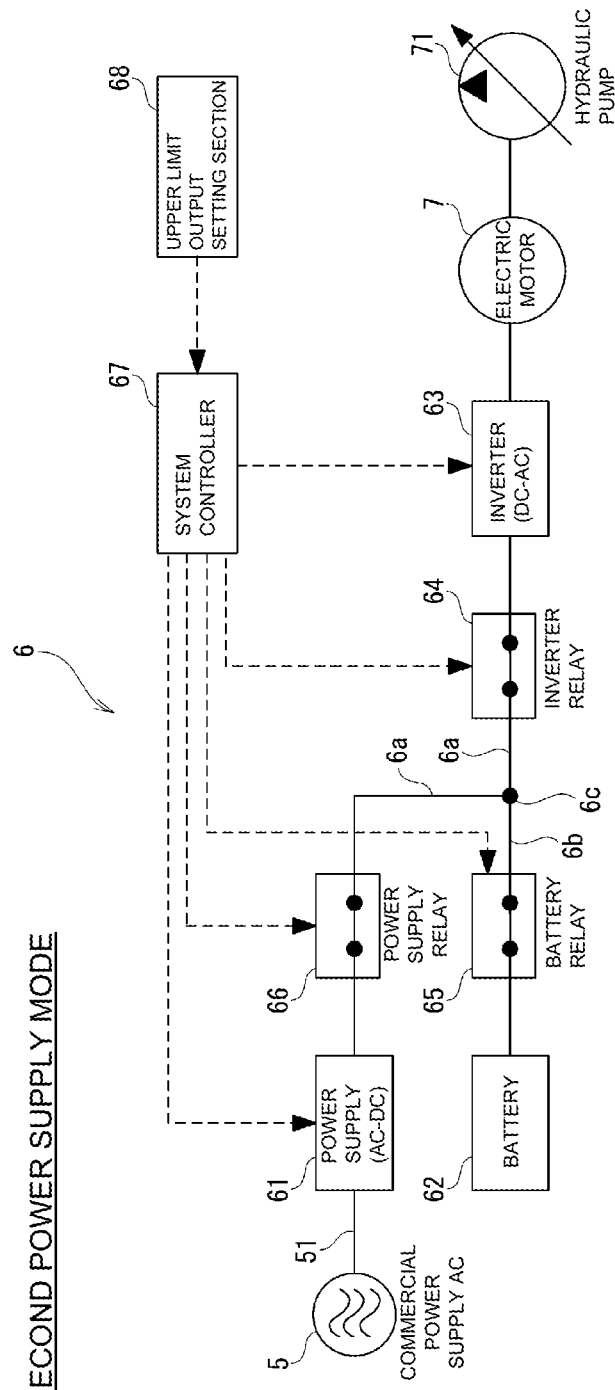
FIG. 3B is a block diagram of the power supply system implementing a second power supply mode.

The power supply system 6 has plural power supply modes illustrated in FIG. 3A to FIG. 3D. As illustrated in FIG. 3A, the power supply system 6 can have a commercial power supply mode (corresponding to the first power supply mode), in which the electric power is only supplied from the commercial power supply 5 to drive the electric motor 7, by contacting contacts of the inverter relay 64 and the power supply relay 66 and separating contacts of the battery relay 65. In this way, a frequency of use of the battery 62 can be reduced, and life of the battery 62 can thereby be extended. In addition, even in the case where the battery 62 is brought into an abnormal state, the work can be continued by using the commercial power supply 5 in the commercial power supply mode.

As illustrated in FIG. 3B, the power supply system 6 can have a two-way mode (corresponding to the second power supply mode), in which the electric power is supplied from the battery 62 and the commercial power supply 5 to drive the electric motor 7, by contacting the three contacts of the inverter relay 64, the power supply relay 66, and the battery relay 65.

As illustrated in FIG. 3C, the power supply system 6 can have a battery mode (the third power supply mode), in which the electric power is only supplied from the battery 62 to drive the electric motor 7, by contacting the contacts of the inverter relay 64 and the battery relay 65 and separating the contacts of the power supply relay 66.

Figure 3D:
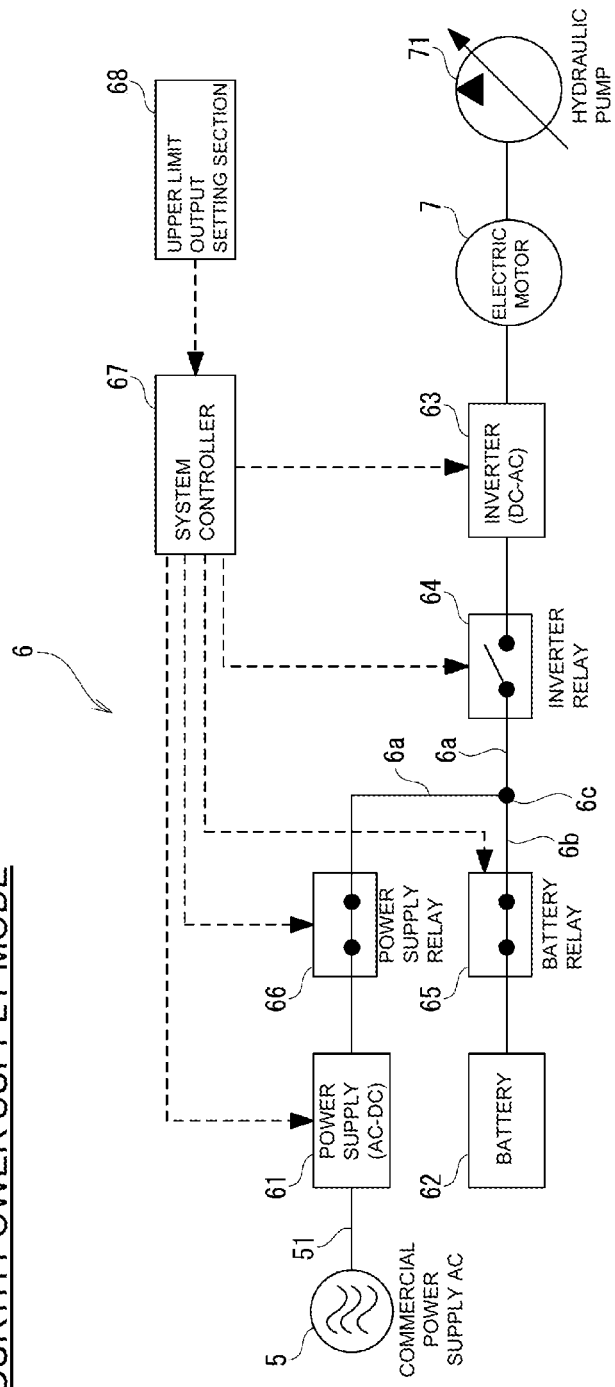
FIG. 3D is a block diagram of the power supply system implementing a fourth power supply mode.

As illustrated in FIG. 3D, the power supply system 6 can have a charging mode (the fourth power supply mode), in which only the battery 62 is charged by the commercial power supply 5, by contacting the contacts of the battery relay 65 and the power supply relay 66 and separating the contacts of the inverter relay 64.

In the commercial power supply mode in which the electric motor 7 is driven by the commercial power supply 5 only, the power supply 61 is preferably controlled on the basis of a rated voltage of the inverter 63. That is, the power supply 61 is controlled to supply a direct-current voltage to the inverter 63 according to the rated voltage of the inverter 63. The power supply 61 is controlled by a command from the system controller 67.

In addition, in the commercial power supply mode, an upper limit value of output of the inverter 63 is preferably set to a threshold value corresponding to a current that can be supplied by the commercial power supply 5. Usually, an upper limit value of the current of the commercial power supply 5 is prescribed by a breaker. Thus, when an upper limit value of the current output by the inverter 63 is set to the threshold value corresponding to the current that can be supplied by the commercial power supply 5, it is possible to prevent the breaker of the commercial power supply 5 from tripping off and to perform the work stably. The output of the inverter 63 can be controlled according to a command from the system controller 67. The upper limit value of the output of the inverter 63 is input to and set by an upper limit output setting section 68 such as a switch or a liquid-crystal panel.

In the two-way mode in which the electric motor 7 is driven by the battery 62 and the commercial power supply 5, the power supply 61 is preferably controlled to have a rated current that is determined by the upper limit value of the commercial power supply 5. When the electric power is supplied from the battery 62 and the commercial power supply 5 to the electric motor 7, a circuit voltage is determined by a voltage of the battery 62. Thus, the power supply 61 can supply the rated current that is determined by the upper limit value of the commercial power supply 5. As a result, the work can be performed stably.

Next, a description will be made on a control method for switching the power supply mode described above. FIG. 4 is a flowchart illustrating a procedure of switching control of the power supply mode. First, the operator turns on the power supply. Next, the operator selects the power supply mode by using a power supply mode selection switch. In step S1, it is determined which power supply mode is selected. In the case where a mode 1 is selected, the system controller 67 turns on the inverter relay 64 and the power supply relay 66 and turns off the battery relay 65 so as to implement the commercial power supply mode (the first power supply mode).

Meanwhile, in the case where a mode 2 or a mode 3 is selected in step S1, in next step S2, it is determined whether the power supply 61 can be used. The power supply 61 includes a control section that determines whether the power supply 61 itself can be used and, if cannot be used, sends an error signal to the system controller 67. In the case where the system controller 67 receives the error signal from the power supply 61, the system controller 67 determines that the power supply 61 cannot be used.

If it is determined in step S2 that the power supply 61 "cannot be used", in next step S3, it is determined whether the battery 62 can be used. The battery 62 includes a control section that determines whether the battery 62 itself can be used and, if cannot be used, sends an error signal to the system controller 67. In the case where the system controller 67 receives the error signal from the battery 62, the system controller 67 determines that the battery 62 cannot be used. If it is determined in step S3 that the battery 62 "cannot be used", the system controller 67 issues an error.

On the other hand, if it is determined in step S3 that the battery 62 "can be used", in next step S4, the system controller 67 turns on the battery relay 65. Next, in step S5, it is determined whether the inverter 63 can be used. The inverter 63 includes a control section that determines whether the inverter 63 itself can be used and, if cannot be used, sends an error signal to the system controller 67. In the case where the system controller 67 receives the error signal from the inverter 63, the system controller 67 determines that the inverter 63 cannot be used. If it is determined in step S5 that the inverter 63 "cannot be used", the system controller 67 issues an error.

On the other hand, if it is determined in step S5 that the inverter 63 "can be used", in next step S6, the system controller 67 turns on the inverter relay 64. In this way, it is possible to implement the battery mode (the third power supply mode) in which the electric power is supplied only from the battery 62 to drive the electric motor 7.

If it is determined in step S2 that the power supply 61 "can be used", in next step S7, it is determined whether the battery 62 can be used. If it is determined in step S7 that the battery 62 "cannot be used", the system controller 67 issues the error. On the other hand, if it is determined in step S7 that the battery 62 "can be used", in next step S8, the system controller 67 turns on the battery relay 65.

Next, in step S9, it is determined which power supply mode is selected. If it is determined that the mode 3 is selected, in next step S10, connection of the power supply cable 51 is checked. When the power supply cable 51 is connected to the power supply port, the power supply 61 detects this and sends a connection signal to the system controller 67. In the case where the system controller 67 receives the connection signal from the power supply 61, the system controller 67 determines that the power supply cable 51 is connected to the power supply port. If it is determined in step S10 that the power supply cable 51 is "not connected", the system controller 67 issues an error.

On the other hand, if it is determined in step S10 that the power supply cable 51 is "connected", in next step S11, the power supply relay 66 is turned on. In this way, it is possible to implement the charging mode (the fourth power supply mode) in which only the battery 62 is charged by the commercial power supply 5.

If it is determined in step S9 that the mode 2 is selected, in next step S12, it is determined whether the inverter 63 can be used. If the inverter 63 cannot be used, the system controller 67 issues the error. On the other hand, if it is determined in step S12 that the inverter 63 can be used, in next step S13, the system controller 67 turns on the inverter relay 64.

Next, in step S14, the connection of the power supply cable 51 is checked. If it is determined in step S14 that the power supply cable 51 is "not connected", the battery mode (the third power supply mode), in which the electric power is supplied only from the battery 62 to drive the electric motor 7, is implemented.

On the other hand, if it is determined in step S14 that the power supply cable 51 is "connected", in next step S15, the power supply relay 66 is turned on. In this way, it is possible to implement the two-way mode (the second power supply mode) in which the electric power is supplied from the battery 62 and the commercial power supply 5 to drive the electric motor 7.

The description has been made so far on the embodiments of the present invention with reference to the drawings. However, it should be considered that the specific configuration is not limited to that described in each of these embodiments. The scope of the present invention is indicated not only by the description of the above embodiments but also by the claims and further includes all modifications that fall within and are equivalent to the scope of the claims.

DESCRIPTION OF REFERENCE NUMERALS

1 excavator
5 commercial power supply
51 power supply cable
6 power supply system
6a first electrical circuit
6b second electrical circuit
6c junction point
61 power supply
62 battery
63 inverter
64 inverter relay
65 battery relay
66 power supply relay
7 electric motor
71 hydraulic pump

The invention claimed is:

1. An electric work machine comprising:
   a power supply configured to convert an alternating-current power supply voltage of an external power supply into a direct-current power supply voltage;
   a battery configured to charge or discharge electric power from the power supply;
   an inverter configured to convert the direct-current power supply voltage into the alternating-current power supply voltage;
   an electric motor configured to be supplied with the electric power from the inverter;
   a first electrical circuit configured to supply the electric power from the power supply to the inverter;
   a second electrical circuit configured to couple the first electrical circuit to the battery;
   an inverter relay that is arranged between the inverter and a junction point of the first electrical circuit and the second electrical circuit;
   a battery relay that is arranged between the junction point and the battery; and
   a power supply relay that is arranged between the junction point and the power supply.

2. The electric work machine according to claim 1 further comprising:
   a first power supply mode configured by contacting contacts of the inverter relay and the power supply relay and separating contacts of the battery relay; and
   a second power supply mode configured by contacting the contacts of the inverter relay, the power supply relay, and the battery relay, wherein
   in the first power supply mode, the power supply is controlled on the basis of a rated voltage of the inverter, and
   in the second power supply mode, the power supply is controlled to have a rated current that is determined by an upper limit value of the external power supply.

3. The electric work machine according to claim 2, wherein in the first power supply mode, an upper limit value of output of the inverter is set to a threshold value corresponding to a current that can be supplied by the external power supply.

4. The electric work machine according to claim 1, further comprising a power supply controller configured to control the power supply.

5. The electric work machine according to claim 4, wherein the power supply controller is further configured to control the power supply relay, the battery relay, the inverter relay, and the inverter.

6. The electric work machine according to claim 1, wherein the inverter relay is coupled in series with and between the inverter and the junction point.

7. The electric work machine according to claim 1, wherein the battery relay is coupled in series with and between the battery and the junction point.

8. The electric work machine according to claim 1, wherein the power supply relay is coupled in series with and between the power supply and the junction point.

* * * * *